UNITED STATES PATENT OFFICE.

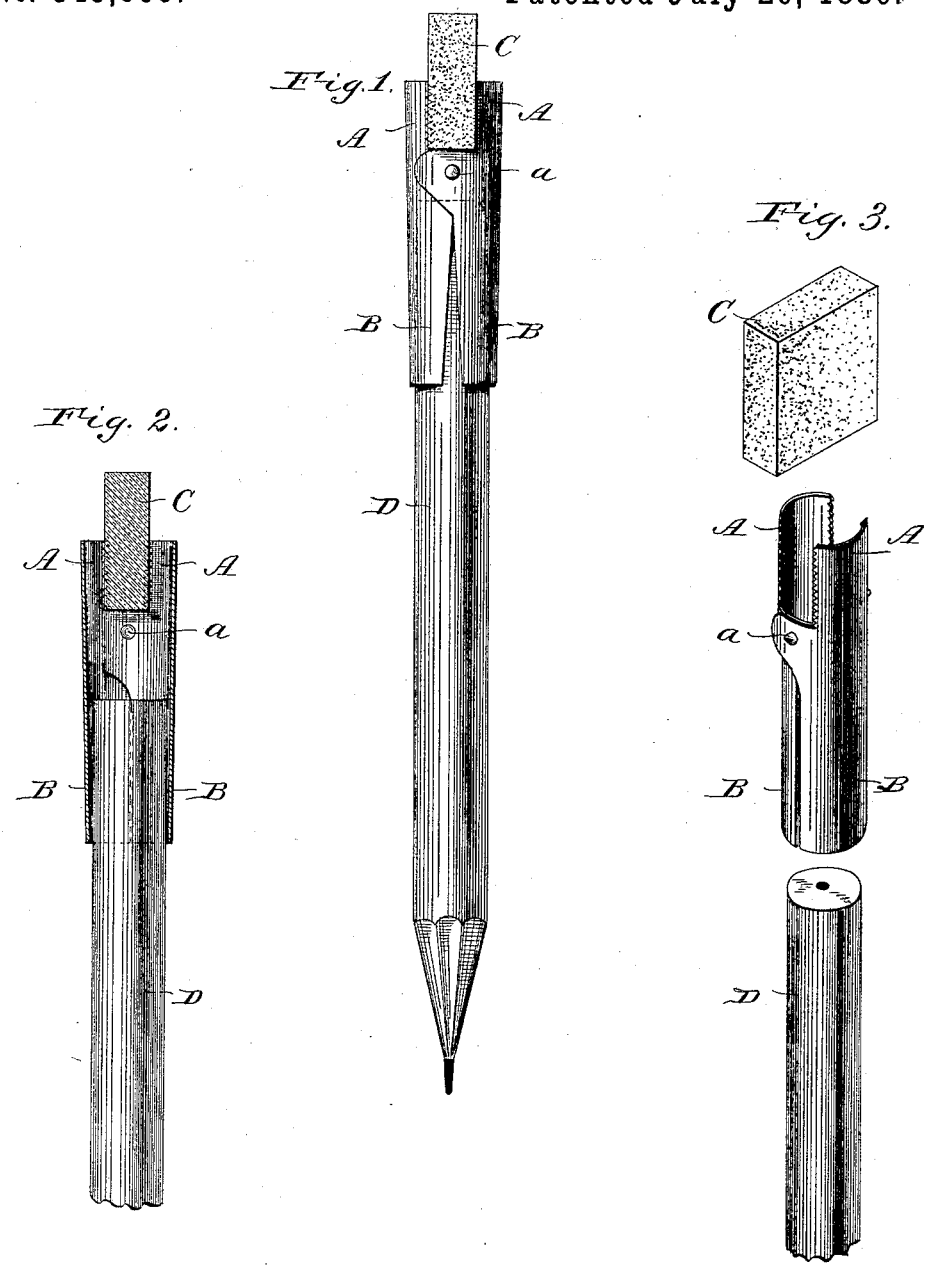

GEORGE SINGLETON, OF JERSEY CITY, NEW JERSEY, ASSIGNOR TO THE EAGLE PENCIL COMPANY, OF NEW YORK, N. Y.

RUBBER-TIP ATTACHMENT FOR LEAD-PENCILS, &c.

SPECIFICATION forming part of Letters Patent No. 345,865, dated July 20, 1886.

Application filed May 22, 1886. Serial No. 202,961. (No model.)

*To all whom it may concern:*

Be it known that I, GEORGE SINGLETON, of Jersey City, in the State of New Jersey, have invented a certain new and useful Improvement in Rubber-Tip Attachments for Lead-Pencils, Pen-Holders, and other Articles, of which the following is a specification.

The rubber-tip attachment which I have invented is characterized by the combination of a socket to receive the stem of the lead-pencil, pen-holder, or other article with which it is to be used, and rubber-holding jaws which are so constructed and arranged that they will be acted on by said stem when the latter is inserted in the socket, to close upon the stick, strip, or piece of rubber or other erasive material placed between them, and to thus hold it firmly.

I prefer to form the attachment so that it shall constitute a point-protector as well, and the socket is constructed to serve this purpose. I also prefer to so construct the device that while the stem of the pencil or other article on which the attachment is placed shall serve to close the tip-holding jaws upon the rubber the rubber shall in turn act as a spring to clamp and bind the socket upon the stem. One convenient form of attachment in which all these objects are attained consists of a tube divided longitudinally into two parts hinged together, the portions on one side of the hinge being fashioned as jaws to receive the rubber tip, and those on the other side of the hinge constituting the socket to receive the stem of the lead-pencil or other article. In other words, the device consists, virtually, of two pairs of jaws, between one of which the pencil is inserted and between the other of which the rubber is held. The expansion of the jaws which receive the lead-pencil causes the other set of jaws to close upon the rubber, and the rubber in turn acts as a spring to hold the first pair closely clamped upon the lead-pencil. This form of attachment is the one which is represented in the accompanying drawings in illustration of my invention.

Figure 1 is an elevation of a lead-pencil provided with the attachment. Fig. 2 is a like view with the attachment in section. Fig. 3 is a perspective view of the three parts—pencil, holder, and rubber tablet—separated from one another.

The attachment consists of a tube split longitudinally into two half-tubes hinged together by any suitable hinge at $a$, thus forming in effect two pairs of jaws, A A B B. The former are formed and shaped to receive between them a tablet, strip, block, or stick of erasive material or rubber, C. In this instance the rubber has the shape of a flat strip or tablet wider and longer than the jaws, so that it will project beyond the jaws at the sides and outer end. The jaws are suitably formed to receive this tablet, and their acting edges or faces may, if desired, be toothed, as shown, or otherwise formed to bite and hold firmly the rubber. The other set of jaws, B, constitutes a socket to receive the pencil D or other stem, such as a pen holder or handle. The rubber C tends to cause these jaws to close together. When, however, the stem or pencil D is inserted between them, as shown in Fig. 1, the effect is to expand or spread them apart, and consequently to cause the opposite set of jaws, A, to clamp tightly the rubber C. The rubber in turn, by virtue of its elasticity, tends under these conditions to cause the jaws B to close firmly upon the pencil D, to which the attachment is thus securely held. By grasping the jaws A between the thumb and finger and pressing them together the socket-jaws B will be expanded, thus permitting the attachment to be removed from the end of the pencil. While the parts are thus held the other end of the pencil—the sharp end or point, for instance—can be inserted in the socket, after which, by releasing jaws A, the socket will again be clamped upon the pencil. Thus the device is not only a rubber-tip attachment for pencils, &c., but a point-protector as well.

It is obvious that the construction of the several parts of the device, as well as of the hinge, may be modified and varied in many respects without departure from my invention.

The action of the rubber-holding jaws need not depend, for instance, upon the expansion and contraction of the socket that receives the pencil; but those jaws, one or both, may be constructed and arranged to be operated on directly by the pencil or other stem inserted in the socket. I therefore do not restrict myself to the details hereinbefore described in illustration of my improvement; but

What I claim as new and of my own invention is as follows:

1. A rubber-tip attachment for lead-pencils and other articles, comprising the combination of a socket to receive the stem of the pencil or other article, and rubber-holding jaws constructed and arranged, substantially as hereinbefore set forth, so that they shall be operated to close upon the rubber by the stem of the pencil or other article inserted in said socket.

2. The combination, in a rubber-tip attachment, of rubber-holding jaws and pencil-receiving jaws, constructed and arranged, substantially as hereinbefore set forth, so that the closing of the one set shall cause the opening of the other set, and vice versa.

3. A combined rubber-tip attachment and pencil-point protector, consisting of rubber-holding jaws and stem-receiving jaws arranged on opposite sides of a common pivot and connected so that the closing of the one set will tend to open the other set, and vice versa, and a strip or block of elastic erasive material located and held between the rubber-holding jaws and acting as a spring to cause the closing of the stem-receiving jaws, substantially as hereinbefore set forth.

4. The longitudinally-split tube having its two parts pivoted or hinged together, as described, and fashioned to form two sets of jaws, A B, on opposite sides of the hinge or pivot, the one to receive a piece of erasive material, the other to receive the stem of the pencil or other article, substantially as and for the purposes hereinbefore set forth.

In testimony whereof I have hereunto set my hand this 20th day of May, 1886.

GEORGE SINGLETON.

Witnesses:
SAMUEL KRAUS,
A. SCHIFF.